UNITED STATES PATENT OFFICE.

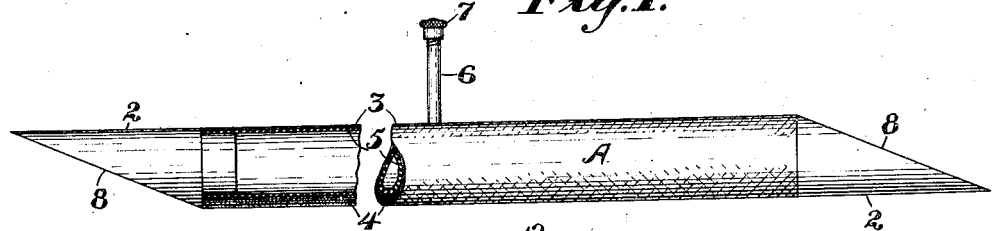
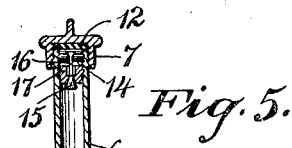
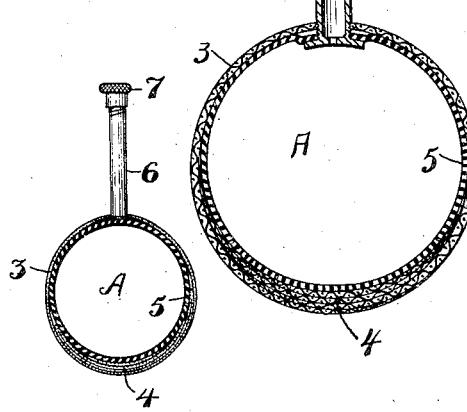
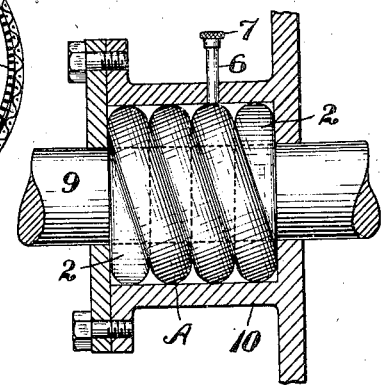
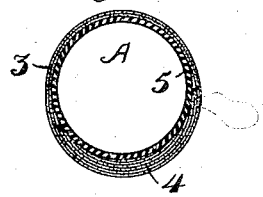

EDWIN SAMUEL JOHNSON, OF OAKLAND, CALIFORNIA, ASSIGNOR OF ONE-HALF TO WILLIAM JAMES KNIGHT, OF OAKLAND, CALIFORNIA.

PNEUMATIC PACKING.

943,023.  Specification of Letters Patent.  Patented Dec. 14, 1909.

Application filed March 18, 1908. Serial No. 421,922.

*To all whom it may concern:*

Be it known that I, EDWIN SAMUEL JOHNSON, a citizen of the United States, residing at Oakland, in the county of Alameda and State of California, have invented certain new and useful Improvements in Pneumatic Packing, of which the following is a specification.

My invention relates to improvements in pneumatic packing.

The object of my invention is to provide a packing permitting expansion without removing the same from its seat, and which can be readily applied and rests compactly in the chamber which it occupies.

My device is especially appropriate for use in connection with piston rods of pumps, elevators or in any stuffing box where fiber packing is usually used.

Referring to the accompanying drawing which illustrates my invention, Figure 1 represents a longitudinal view of my pneumatic packing partly shown in section. Fig. 2 is an enlarged transverse section of the said packing, showing the feeding tube in connection therewith as rearwardly affixed thereto. Fig. 3 is a view of my packing as contained in a stuffing box, and Fig. 4 is a section of the packing. Fig. 5 is also an enlarged transverse section of said packing showing the valve hereinafter mentioned in section.

In the figures A represents the said packing. Solid rubber ends or plugs for said packing are shown at 2, the same being cut angularly as shown at 8 so that the ends of the packing will fit evenly and snugly in the box.

3 shows the flexible covering for the intermediate flexible folds 4.

5 indicates the inner flexible tube preferably of rubber.

6 shows the flexible tube for supplying air to expand the inner tube 5, the same being surmounted by the nipple 7 having a check-valve thereunder as shown in Fig. 5, the said valve being also known as a bicycle valve. The said valve consists of a head 15 and a stem 16 which are contained in a threaded plug having a slot for said stem and a seat for said head centrally contained therein. The interior of the feeding tube 6 is threaded to accommodate the threaded plug 17. The said stem and head are vertically movable in said plug.

12 indicates a washer to make a tight joint for the nipple 7 when said nipple is screwed on the tube 6.

14 indicates a slot in the plug 17 whereby the said plug may be inserted in the tube 6 by means of a screw driver. The tube 6 may be cemented to the packing A.

9 shows the piston rod and 10 the stuffing box.

The intermediate folds and covering therefor are preferably of canvas and the folds are arranged as shown in Fig. 2, and the packing so surrounds the piston that the covering and the folds through wear are in engagement therewith, the said folds and covering in the construction of the packing being coated with cement so that the same with the inner tube 5 becomes one integral object. By supplying air through the feeding tube 6 as shown in Fig. 1 by means of a bicycle pump the inner tube 5 can be expanded so that a uniform pressure is exerted on the piston rod notwithstanding that the canvas covering or folds as the case may be become worn by the friction of the piston rod.

In the construction of my packing having a small diameter two of the coverings 3 are preferably used, but for the larger sizes of the same more coverings may be used with advantage, the folds of the first-named size having a thickness of from one-eighth to one-fourth of an inch and are thence increased proportionately with the enlargement of the packing as may be found suitable. In the adjustment of my packing a hole should be bored into the stuffing box as shown in Fig. 3. The solid rubber ends 2 are cemented to or "cooked" into the rubber tube 5 in the construction of the packing as may be preferred.

In the arrangement of the folds and coverings the flexible material may be folded and cemented the desired number of times and then the material may be wound on the tube 5 so as to cover such folds without separating the same.

The invention may also be denominated a stuffing box packing. The folds 4 may also be applied in the construction of the packing in the form of strips, the narrowest strip being contiguous to the tube 5 and the superimposed strips gradually widening to the covering 3, cement being used as before mentioned, the whole being expansible through the pumping of air into the tube 6, to maintain a uniform pressure upon the piston-rod.

Having thus described my invention what I claim as new and desire to secure by Letters Patent, is:

1. In a stuffing-box packing a flexible tube having a transverse aperture in its wall and solid ends, a plurality of folds of flexible material in contact therewith, said folds being superimposed, and a covering of flexible material encircling said folds and said flexible tube.

2. In a stuffing-box packing, a flexible tube having a transverse tube opening therein provided with a feeding tube and valve and having solid ends, a plurality of superimposed folds of flexible material in contact therewith, and a covering of flexible material encircling said folds and said flexible tube.

3. In a stuffing-box packing a flexible tube having a transverse feeding tube opening therein provided with a nipple and valve, said flexible tube having solid ends with diagonal faces, a plurality of superimposed folds of flexible material in contact therewith, and a covering of flexible material encircling said folds and said flexible tube.

4. A packing for piston-rods having in combination with a stuffing box provided with a transverse opening, a cylindrical flexible tube having solid ends with diagonal faces, said faces engaging the ends of said box, a pliable feeding tube opening into said flexible tube having a nipple and valve, a plurality of superimposed folds of flexible material in contact with said flexible tube, and a covering of flexible material encircling said folds and said flexible tube.

5. A packing for piston-rods having in combination with a stuffing-box provided with a transverse opening, a cylindrical flexible tube having solid ends with diagonal faces, said faces engaging the ends of said box, means opening into said flexible tube for supplying air thereto, said means extending through said transverse opening, a plurality of superimposed strips of material of unequal width in contact with said flexible tube, and coverings of flexible material encircling said strips and said flexible tube.

In testimony whereof I affix my signature, in presence of two witnesses.

EDWIN SAMUEL JOHNSON.

Witnesses:
F. E. FARMER,
CHAS. T. STANLEY.